(12) United States Patent
Aslam et al.

(10) Patent No.: US 6,704,688 B2
(45) Date of Patent: Mar. 9, 2004

(54) METHOD FOR INSPECTING AND RECORDING MACHINE COMPONENT CONDITION DATA

(75) Inventors: Sami Aslam, Clifton Park, NY (US); Donald Ernest Woodmansee, Simponsville, SC (US)

(73) Assignee: General Electric Company, Schenectady, NY (US)

( * ) Notice: Subject to any disclaimer, the term of this patent is extended or adjusted under 35 U.S.C. 154(b) by 185 days.

(21) Appl. No.: 09/977,365

(22) Filed: Oct. 16, 2001

(65) Prior Publication Data

US 2003/0074160 A1 Apr. 17, 2003

(51) Int. Cl.$^7$ ................................................ G01B 7/00
(52) U.S. Cl. ....................... 702/182; 702/176; 702/187; 708/139; 708/142
(58) Field of Search ................... 702/182, 187, 702/176; 708/139, 142; 707/5, 10; 709/223, 225, 217, 250, 316; 340/10.6, 825.69, 825.72

(56) References Cited

U.S. PATENT DOCUMENTS

| | | | | |
|---|---|---|---|---|
| 5,321,629 A | * | 6/1994 | Shirata et al. | 702/187 |
| 5,856,931 A | * | 1/1999 | McCasland | 702/182 |
| 5,881,115 A | | 3/1999 | Lipner et al. | |
| 6,182,083 B1 | | 1/2001 | Scheifler et al. | |
| 6,259,960 B1 | | 7/2001 | Inokuchi | |

* cited by examiner

*Primary Examiner*—John Barlow
*Assistant Examiner*—Hien Vo
(74) *Attorney, Agent, or Firm*—Nixon & Vanderhye P.C.

(57) ABSTRACT

A method of inspecting and recording inspection data of machine components, the method including selecting a machine component among a plurality of machine components for inspection; identifying predefined areas of the selected machine component for inspection; identifying a fixed set of conditions allowed to be reported for the select machine component; inspecting the predefined areas of the select machine component; and recording inspection data as continuous numerical values to quantify entry for subsequent querying over a chosen set of machine components.

25 Claims, 8 Drawing Sheets

| Data Entry | | | | |
|---|---|---|---|---|
| File Edit Tools View | | | | |

| Insp Sheet | Add / Del Job No | Mod Job / Job Part | Add To DB | Attachments |
|---|---|---|---|---|

| | | Dwg Loc | Part Pic | Home |

Part Type: Stage 1 Nozzle ▼

PART

Serial #: 2k58 ▼    Drawing: HD1340F    Group: G001

Vendor ID: 04150    Vendor: Delavan    Mftr Date: 20-Apr-99

Clear    Modify                                                                        Add

DRAWING                                                                COMPANY

| DrawSn | PartType | Frame |
|---|---|---|
| ▲ HD1340F | Stage 1 Nozzle | 7 |
| * | | |

Type ▼

| * | | |
|---|---|---|
| | | |

METHOD FOR INSPECTING AND RECORDING MACHINE COMPONENT CONDITION DATA

This invention relates to turbines and generator machinery. More particularly, it relates to a digital data entry method for recording observed and measured condition of machine components during inspection.

BACKGROUND OF THE INVENTION

The structural integrity of critical engineering components is often dependent on the capability and reliability of the inspection procedures used in acceptance after manufacture and in life-cycle management while in service. Inspection reliability is often expressed in terms of the probability of detection. Although the probability of detection is an end to end measure of the performance of an inspection process at a specific time, it reflects the capability of a procedure and can only be viewed as a process reliability measure if the inspection process is under control.

Inspection process control is, in turn, widely viewed as an issue of human skills and skills variables. It is commonly assumed that automation of a process produces a reliable process. Indeed, variances in the performance of any automated process is a function of the variances of all critical process parameters that are inherent to the process. Inspection of engine components after periods of operation is important not only to effectively service the worn components but also to redesign or modify the components to increase component. Such an inspection procedure, in the past, has been largely conducted by presenting an inspector with paper schematics of parts to manually mark up the damaged sections of the inspected parts.

Manually reviewing the inspection charts for a machine having thousands of components is not only time consuming but also prone to errors. Further, "free field" text entries by an inspector to describe a part allows an inspector to describe a component using any language or terminology of inspector's choice. A database search conducted on the assembled inspection data would be reduced to a so-called "string search" as a query would be specifically searching for familiar words used by the inspector.

When the search results obtained by the reduced result set are compared with other components/parts inspected by a second inspector who chose to use a different set of words to record a similar fault in a component, the outcome of the comparison process would lead to erroneous results; i.e., the same observed condition would be reported using different text by one inspector than it would by another inspector. In fact, the challenge of mastering such a lexicon in a digital database would only be a first challenge. The second would be to assure that the inspection was as complete as necessary.

Finally, even resolving differences in textual language would still not provide the quantitative measures of those part conditions. Engineers evaluating part conditions need fine discrimination among intensities of part condition. For example, choices among "usual wear", "badly worn", and "hardly worn" are not as valuable as "wear depth" and "30 mils". The need to report measures of conditions as such "continuous" values is highly valued. Moreover, such values are more easily searched in a database and distributions of conditions like "wear depth" can be described mathematically in histograms showing counts of how many parts exhibited wear to various wear depths.

Also, since the inspection charts are not stored in a searchable database, there appears to be no method to productively search for identified defects of machine components. Even if the inspected charts are scanned into bit-mapped images and stored in a database, currently there appears to be no current capability to search the bit-mapped images for identified defects.

Another problem with the one-by-one manual inspection on schematic forms is that the inspector must manually recreate defects that are identical from part-to-part in a set. Thus, there is a need to digitize the data entry procedure and provide a capability to search the recorded information for future use.

Automating the inspection process and eliminating factors leading to human error would produce consistent inspection results. Further, automating the inspection process and storing the status of the inspected components in a database system which is capable of being searched would eliminate the manual exercise of analyzing the observed information by a knowledgeable reader. Greater confidence can be established by automating the entry of inspected information and digitally recording the same while providing a capability to search the recorded information for future uses.

BRIEF SUMMARY OF THE INVENTION

Accordingly, the present invention provides a method to obviate manually capturing inspection data of machine components by facilitating the capture of inspection data digitally so that captured inspection data may be analyzed as a complete set, and also in conjunction with data from similar sets.

The present invention relates to a method which facilitates digitization of data entry procedure by providing an inspector with a computer system having a user interface with a drop-down menu. The drop-down menu comprises a plurality of data entry selection tables listing various machine components, and respective areas/features to be inspected on each component, and conditions to be measured and the units of value they are to be reported in. Specifically, a first table includes a list having various machine components/parts of a machine under inspection, and the inspector may select a specific component class (referred to herein as part-type) from the list of provided part-types. For example, for a given model of gas turbine engine, a combustion liner and a first stage bucket would each be selectable from a menu list of distinct part-types. The user interface provides another dropdown menu list for selecting a predefined area, or feature, to be inspected. Finally the inspector enters an observed condition of the component as a continuous value in units specified in the condition.

For a given part type, the maximum set of combinations is approximately the product of the total number of prescribed areas or features and the number of allowed conditions. The prescribed set of combinations includes those that are identified, preferably by an engineering group, to have physical significance. A subset of the prescribed set is a "mandatory" list of combinations that engineers prefer to be reported for every inspected part.

Each individual continuous data entry, for an individual serialized part of a given part-type, is preferred to have an associated predefined part area (e.g., "liner body section") or predefined feature (e.g., "circumferential weld on aft section" and a predefined condition (e.g., "maximum crack length (in")") associated with the reported value (e.g., "5.5") Conditions may be reported in units of length, counts, color codes (to specify color appearance), etc.

The inspection information is stored as digitized data and is searchable by a database engine to quantify issues on a part set or on a fleet-wide basis. The approach of the present method also improves inspection productivity where many defects are indeed similar on parallel parts of a given part-type exposed to the same in-service operating history.

In one aspect, the present invention provides a method of inspecting and recording inspection data of machine components, the method comprising the steps of selecting a machine component among a plurality of machine components for inspection; identifying predefined areas of the selected machine component for inspection; identifying a fixed set of conditions allowed to be reported for the select machine component; inspecting the predefined areas of the select machine component; and recording inspection data as continuous numerical values to quantify entry for subsequent querying over a chosen set of machine components.

The inspection step includes creating benchmark inspection values for the selected machine component by manually entering information into data fields; and comparing inspection data of other individual machine components with the inspection values of the benchmark component. The creation step preferably includes identifying the benchmark inspection values in a distinct color pattern. The method further comprises enabling free field text entries for a group of machine components as well as for each individual machine component; and adding new data entry fields to each machine component, identifying a minimum structured set of conditions independent of a machine component being inspected. The data entry fields preferably include one or more of coordinate measuring machine (CMM) data-files, bit-mapped schematics, photographs, general text files. The data entry fields are preferably added by providing communication links to files stored at a remote location. The method of inspecting and recording inspection information also includes the steps of reducing areas or features for inspection; and limiting the conditions of a predefined area of the select machine component.

In another aspect, the present invention provides a method for entering inspection data of machine components in a database, the database comprising a plurality of user interface templates, each template including data fields for identifying a machine component, the method comprising selecting a machine component among a plurality of machine components; selecting an area or a feature of the selected machine component in a first menu of user interface template; inspecting the selected area of the machine component; and recording inspection data as continuous numerical values in a second menu, the second menu identifying a list of conditions related to the select area of the select machine component.

In a further aspect, the present invention provides an apparatus for inspecting and recording inspection data of machine components, the apparatus comprising means for selecting a machine component among a plurality of machine components for inspection; means for identifying predefined areas of the selected machine component for inspection; means for identifying a fixed set of conditions allowed to be reported for the select machine component; means for inspecting the predefined areas of the select machine component; and means for recording inspection data as continuous numerical values to quantify entry for subsequent querying over a chosen set of machine components.

In yet another aspect, the present invention provides a method of recording inspection data of machine components in a database system, the method comprising identifying structured inspection areas or features of a select machine component; identifying a minimum structured set of conditions that are independent of a machine component under inspection; and recording condition of the select machine component as a continuous numerical value.

In a further aspect, the present invention provides an apparatus for recording inspection data of machine components in a database system, the apparatus comprising means for identifying structured inspection areas or features of a select machine component; means for identifying a minimum structured set of conditions that are independent of a machine component under inspection; and means for recording condition of the select machine component as a continuous numerical value.

The inspection information may be analyzed and displayed automatically in the form of Weibull predictions of defect appearance or exceeding some limit value. Analysis of the inspection data may be performed as shown in a co-pending application having Ser. No. 09/864,322, the entire contents of which are incorporated herein by reference.

BRIEF DESCRIPTION OF THE DRAWINGS

FIG. 2 illustrates a data entry inspection table user interface for obtaining information about a part type and the area of observation of the part in accordance with the present invention;

FIG. 3 is a variation of the user interface as shown in FIG. 2;

DETAILED DESCRIPTION OF THE INVENTION

Figure 1:
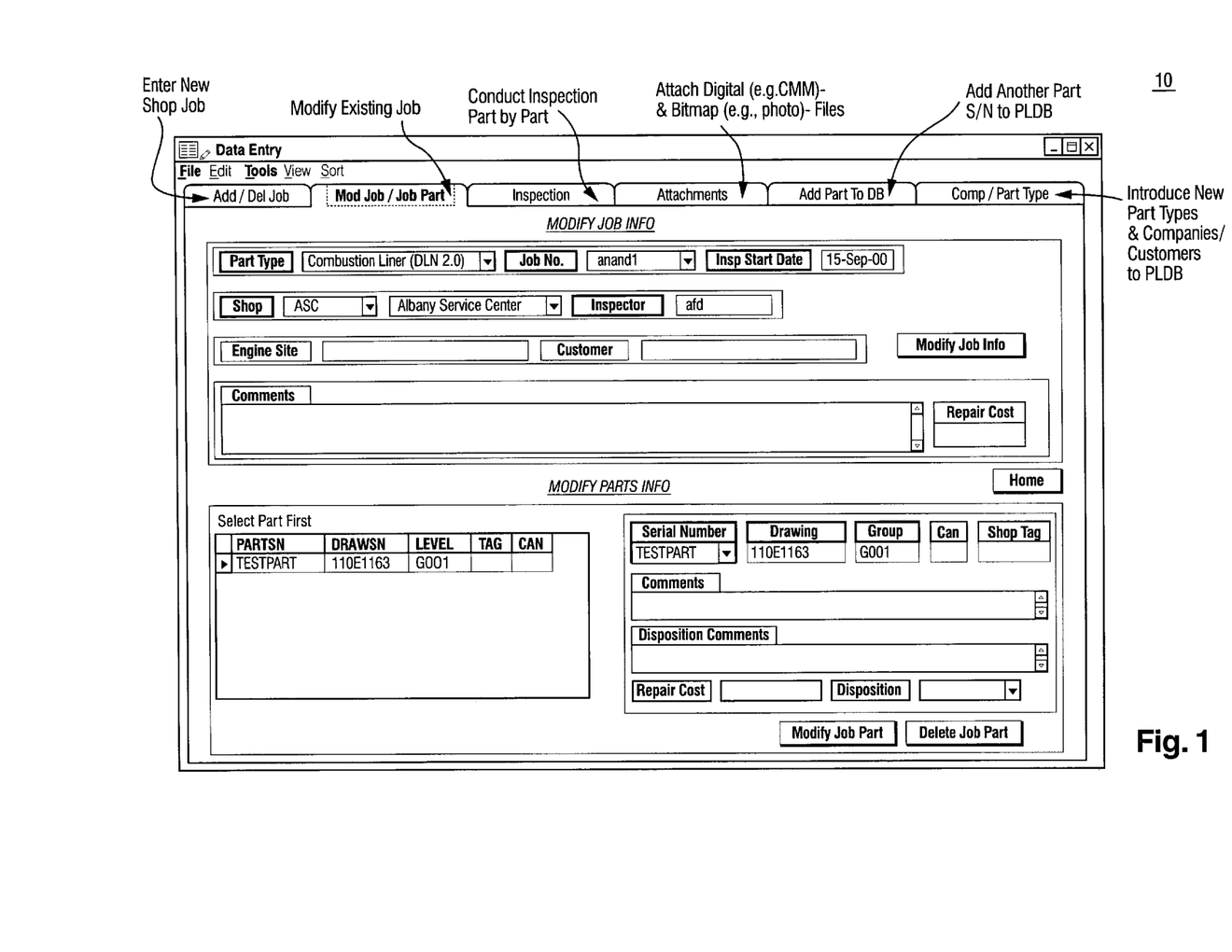
FIG. 1 illustrates a user interface for facilitating inspection process control in accordance with an exemplary embodiment of the present invention.

FIG. 1 shows a user interface for facilitating inspection process control in accordance with an exemplary embodiment of the present invention. The user interface 10 prescribes the inspection by clearly identifying individual combinations of subsets of two orthogonal menus for each observation being requested. Specifically, FIG. 1 shows a user interface for modifying an existing job or a job part.

FIG. 2 illustrates a data entry inspection table user interface for obtaining information about a part type and the area of observation of the part in accordance with the present invention. Selection of a part type from among various part types is selected using menu 12. Once a specific part is selected, various areas of the selected part are displayed in a first menu 16, i.e., first menu 16 specifies a list of all the areas or features of a part surface that are to be inspected or are available for recording observations. For example, an area might be the upstream face area of a turbine bucket dovetail, and a feature might be a specific weld line on a part or the outer edge of a bucket tip. This menu of area definitions does not change for different parts, i.e., the organization of the menu structure does not change even if the design of the specific part is one of several revisions. For example, a part with an individual serial number of a given part-type. It will, however, be appreciated that the contents of the menu displaying the various areas of a selected part may changed depending on the part.

A second menu 18 specifies a list of conditions that an inspector may choose from in order to describe the inspector's observations within the area as selected in the first menu 16. These conditions may vary from color, to presence of cracks, to loss of metal corrosion coating, denting, etc., and could apply generally to any surface identified in the first menu 16 without limitation to a specific area of a part under inspection. The general application of these conditions, called as general condition listing, to all part-types makes it easier for a given inspector and for a user querying the resulting database for condition distributions in a chosen set of inspected parts. The general condition listing may be considered general even if the listing is nested, i.e., all conditions related to a specific condition are covered in a sub-menu of conditions including all other sub-conditions related to the specific condition.

Menus 16 and 18 prescribe the combinations which the inspector is asked to address. The entry of the inspector's observations are specified by the individual condition requested as identified at field 22. For example, a requested condition of crack count would be entered as an integer value. The computer program used in generated the user interface menus is appropriately set up to select a specific measurement format from a list of various measurement formats. For example, United States has adopted a FPS system, while some countries in Europe and Asia use MKS system. Thus, the measured inspection data is stored in country specific formats where inspection is performed.

Observations by the inspector are not entered as binary responses (for example, "yes" or "no" type of entries). Rather, the information is entered into the database as continuous-numerical or unlimited integer values. Entry of information in this continuous numerical format ensures that a maximum amount of information is conveyed in a single observation, and that statistical distribution analyses may be performed on the reported observations.

The productivity in conducting an inspection using the process as described above with respect to FIG. 2 may be enhanced by limiting the inspection scope to a "base" inspection requirements set. For example, a part with 50 areas/features and with 40 possible conditions presented could present up to 200 individual cells of information that an inspector would have to fill out for each part in a set. This overwhelming amount of information may be limited by the inspection specification for a given part set by reducing the list areas to be inspected, and by limiting the conditions requested for any required areas. The reduced combined set of required area/condition combinations for inspection entry are referred to as "base" inspection requirement. The non-critical areas of an inspection part that are eliminated from the area/condition combination set in order to create the base inspection requirement.

Likewise, some other conditions are eliminated as they don't realistically apply to evaluate part life of a part. For example, the 1$^{st}$ stage bucket for a 7FA engine was originally designed without thermal barrier coating (TBC). However, later bucket designs for a 7FA engine would allow use of a ceramic TBC on the bucket. If the inspector realizes that a particular set did not have TBC, then several TBC conditions could be easily eliminated from the inspection menu, thereby substantially reducing the amount of information required to be entered by the inspector.

The productivity in conducting an inspection using the process as described above with respect to FIG. 2 may also be enhanced by recording inspections by noting exceptions to an established benchmark inspection. Here, an inspector creates a benchmark inspection for a specific member of a part set by filling in all the requested entries manually. The efficiency of the benchmark inspection may be best achieved if the inspection is done on a part that appears to be typical of the majority of the part set. Upon manually making the inspection, the inspector copies the entire set of entries for that original benchmark part inspection, and then pastes the entries into the inspection cells for two or three subsequent parts in the set while clearly identifying those values as "copied". This is illustrated by numeral 24 in FIG. 2. Identification of copied values may be shown by identifying them in a different color, thereby alerting an inspector that the values are copied and not original values.

For each copied inspection, the inspector compares the current part with the benchmark part and only changes those observations that are different. This procedure minimizes inspector input for non-benchmark parts, thus enabling the inspector to focus on comparisons rather than zero-based inspections on each part. Since most part sets have more similar than differing observations, it may even be possible to start an inspection using a benchmark from a previous engine set part to create the benchmark for a current set.

Machine parts having repeating structures, such as for example, airfoils in a nozzle segment, the data entry user interface of the present invention is programmed to enable inspection of the first vane to be a benchmark vane which is then copied into subsequent vane inspections on a similar part. This process enables to increase the efficiency of inspection by exception method.

Figure 4:
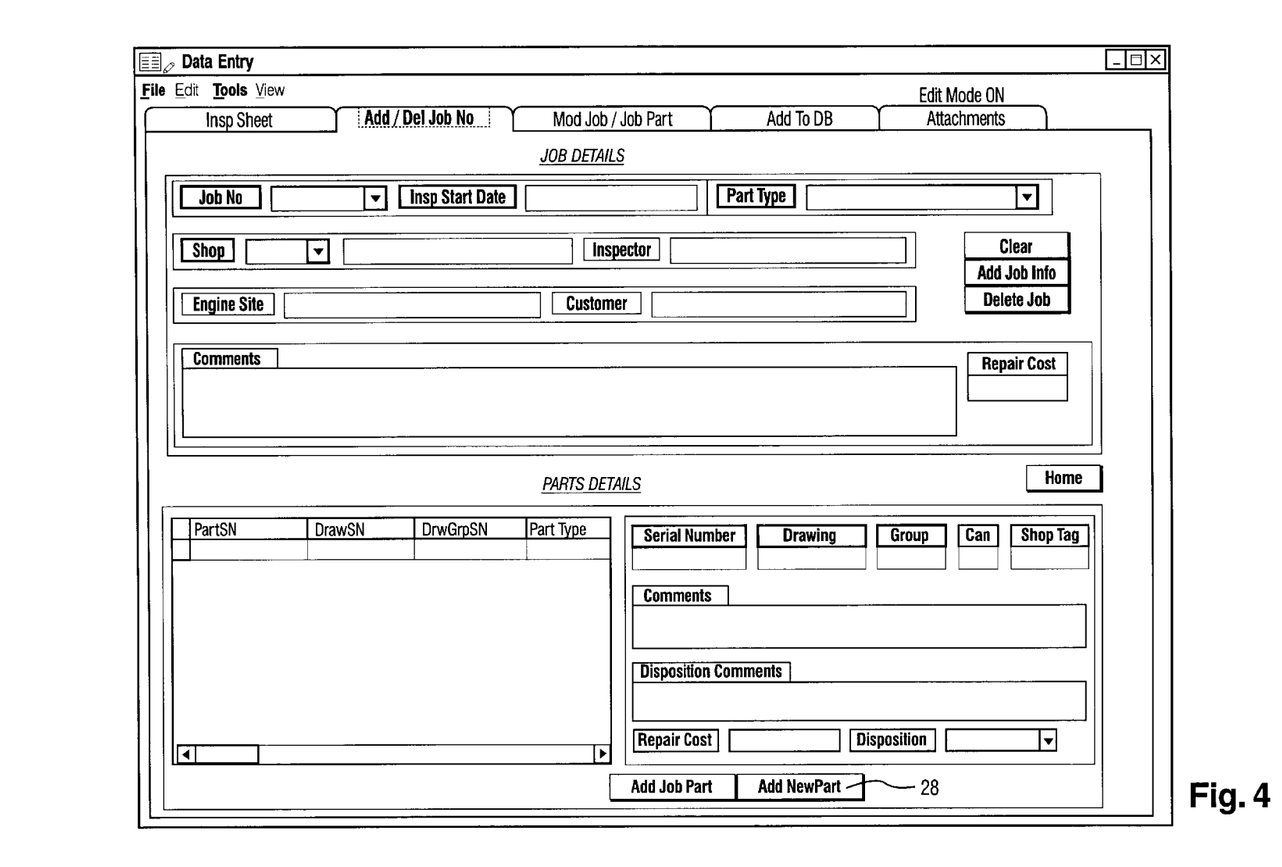
FIGS. 4–7 illustrate various data entry user interfaces for entering information about a part and its condition.
Figure 5:
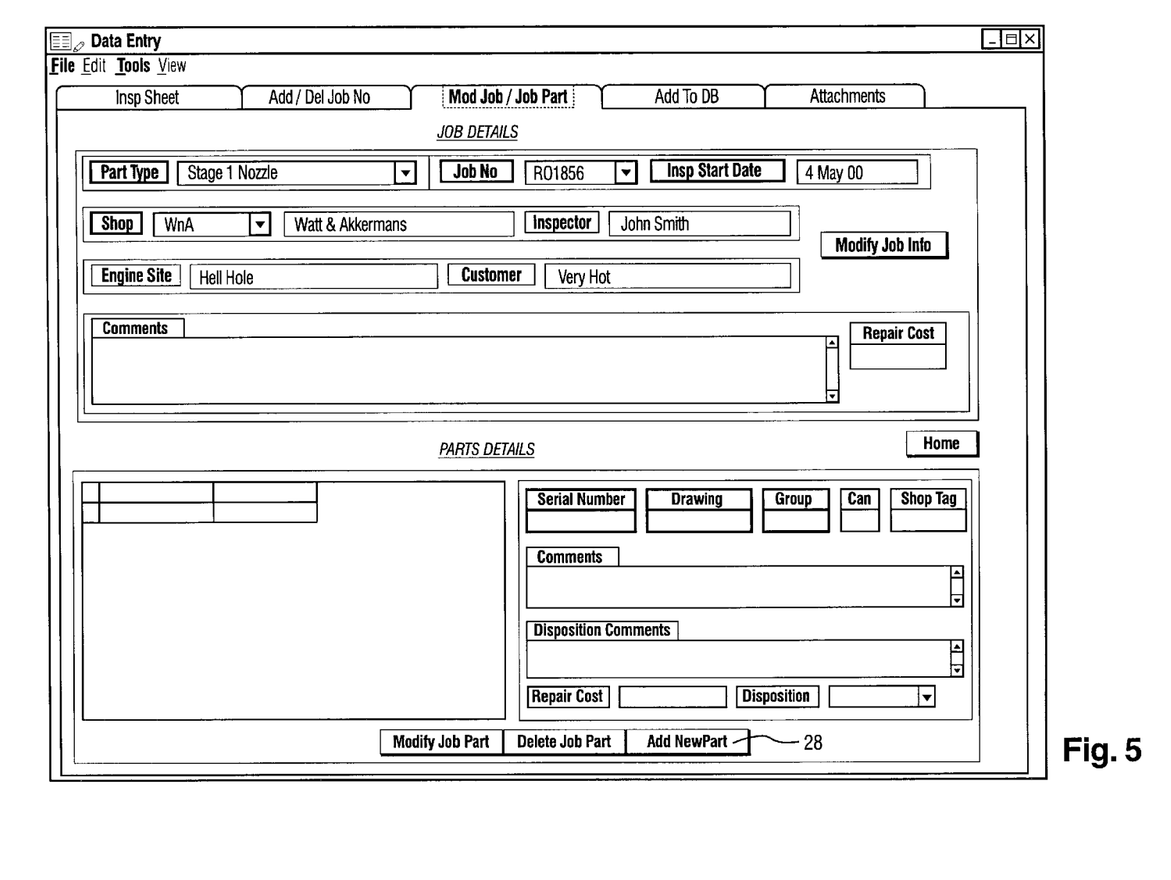
Figure 6:
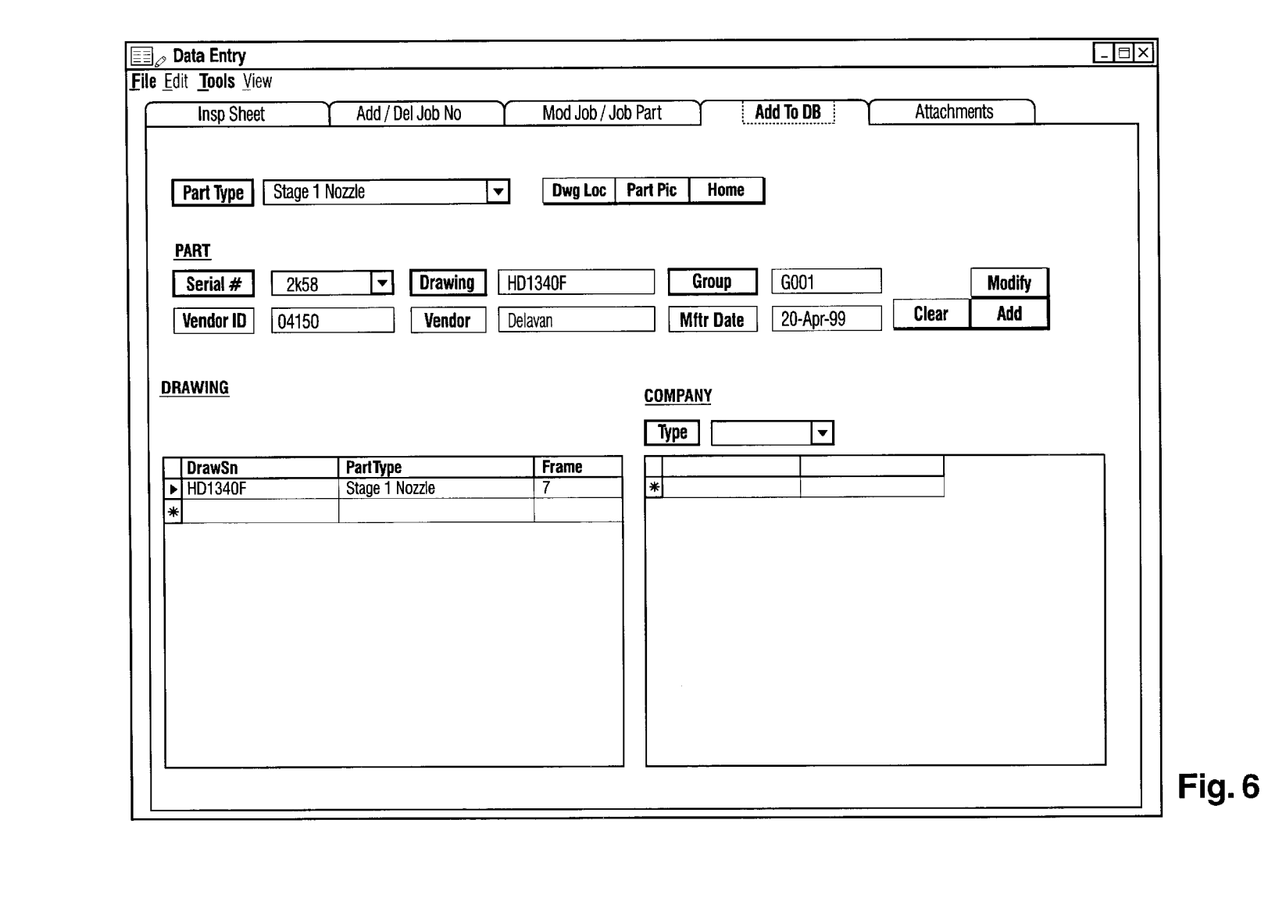
Figure 7:
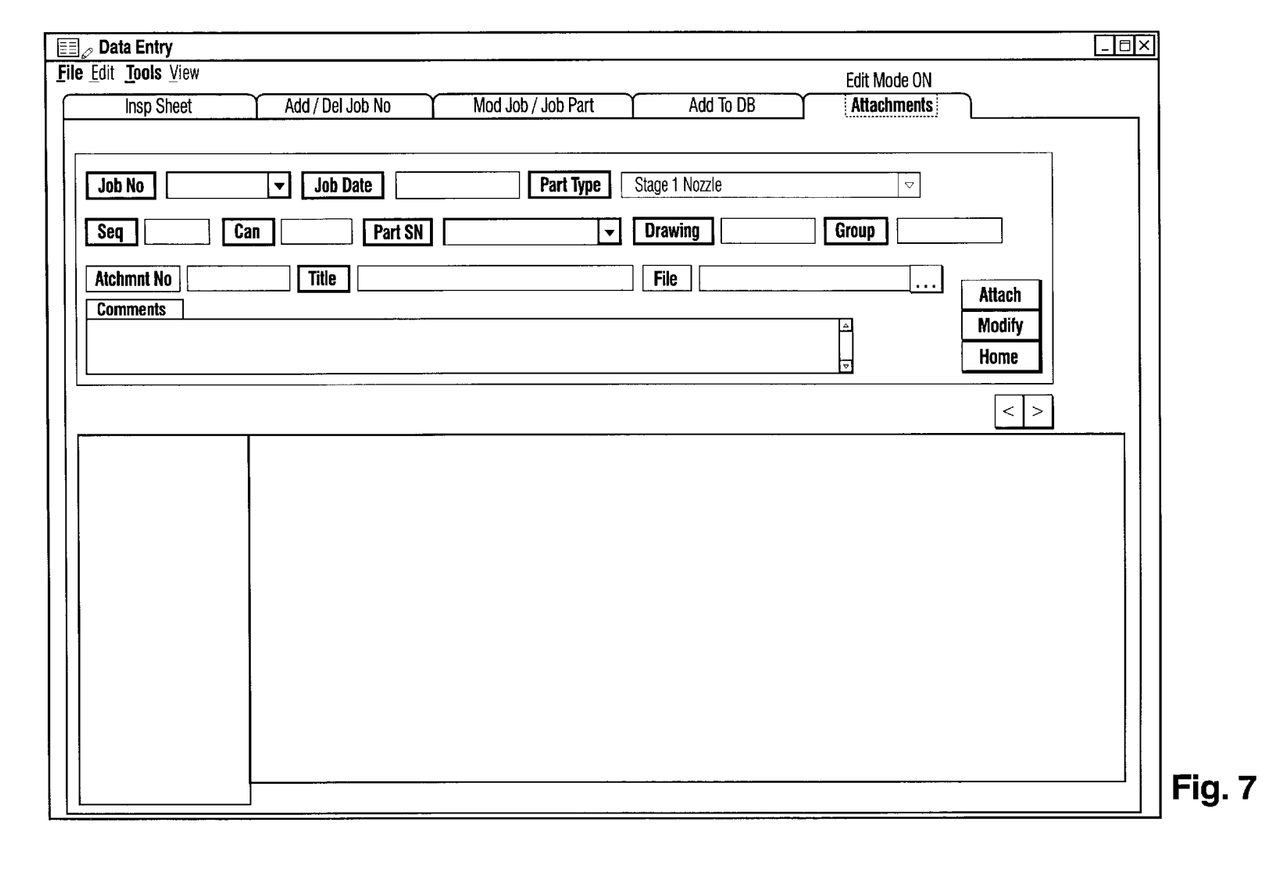

During the conduct of a "base" inspection, the inspector may desire to report a condition that is not included in the "base" inspection, and further that condition may not be in an area listed in the base inspection. In such a case, the user interface has provision for enabling the inspector to insert a new combination of area and/or part condition anywhere in the inspection table listing, and the record the values of that condition for just that single part. This is identified by numeral 28 in FIGS. 4 and 5. It will be appreciated that the inserted combination will only pertain to the part set that is currently being inspected. Upon completion of inspection of the current part set and initiation of a new part set for inspection, the "base" requirements list is made to reappear and the inspection process is continued as described above. This feature provides the inspector with considerable discretion in reporting digital observations not foreseen by the "base" inspection specifier, and still have the observations searchable by querying the database storing inspection data.

Figure 8:
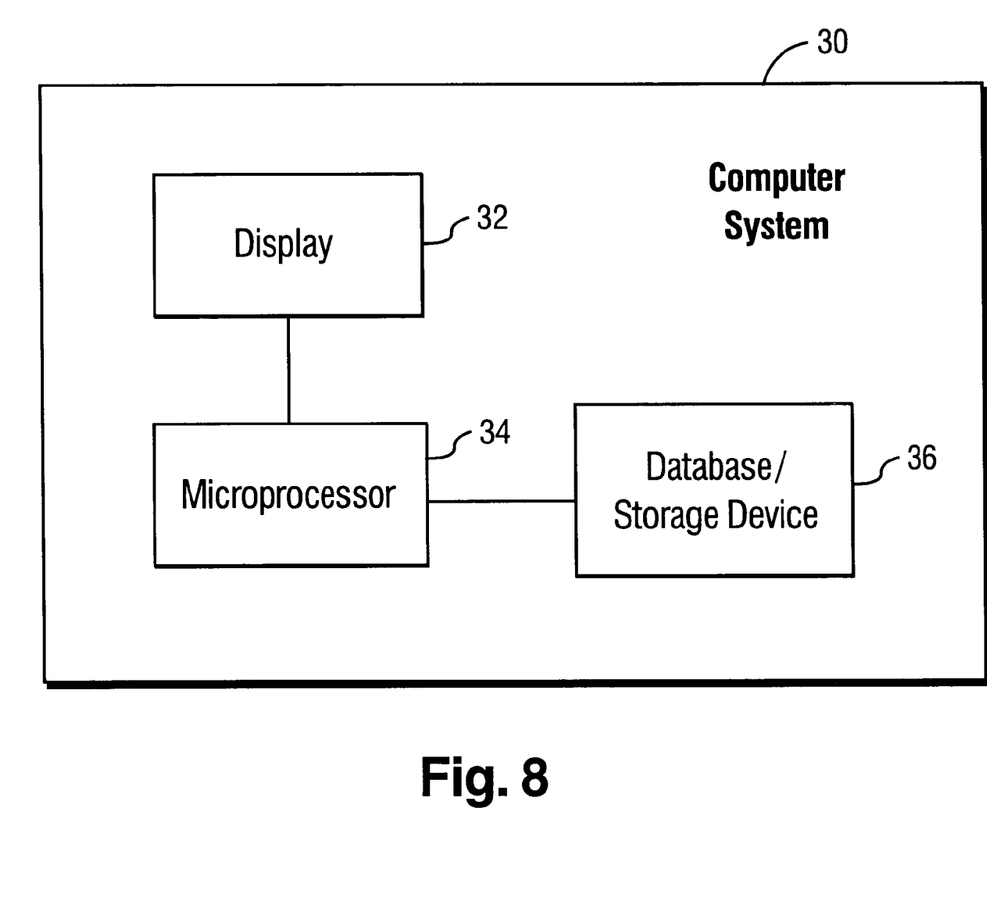
FIG. 8 shows a computer system having a processor and a storage device for processing part related information and storing part related data and displaying various user interfaces as in FIGS. 2–7 in accordance with an exemplary embodiment of the present invention.

FIG. 8 shows a computer system 30 for processing and storing the inspection data information and also to display the data entry tables and the user interfaces as in FIGS. 1–7. The computer system 30 includes a display 32 for displaying the data entry user interfaces and other information including part sets, schematics of part sets, to name but a few. A microprocessor 34 processes the inspection data information entered by an inspector. Further, microprocessor 34 controls the operation of the computer system 30 including all the relevant software for enabling the display of user interfaces as identified in FIGS. 1–7, data entry and processing of the entered data. A database storage device 36 stores all the data, related to a part set, entered into the computer system by an inspector.

The advantages of the present invention include the flexibility in providing the desired digital inspection scope while enabling the inspection of a part set to be expanded digitally to more than the requested scope. Moreover, the use of a computer system to improve the productivity of inspection process by conducting inspections by exception is clearly identified to increase the efficiency of the inspection method. Finally, the present invention provides a means for qualitatively capturing inspection data on any kind of part and enabling the recovery of that data, either on an individual part, a part-set, or a fleetwide basis to provide valuable business information.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, free field text entries are enabled for each group of parts and for each individual part. These can be useful to trigger expanded digital inspection scopes, but the present invention is intended to capture the key observations related to a part by digital dropdown entry menu so that they are more readily interrogated by a database query engine. Similarly, other data entry fields may be added to a part set. Also, individual part inspection areas may be added to a data entry field, thus increasing the gamut of base requirements. Other data-files that may be added to data entry fields include coordinate measuring machine (CMM) data files, bit-mapped schematics, photographs, or more general text files, to name but a few. These files may be captured as direct attachment to a data record or as "pointers" or "paths" or "links" to the files that are stored at a remote location.

What is claimed is:

1. A method of inspecting, recording and processing inspection data of machine components, the method comprising:

selecting a machine component among a plurality of machine components for inspection;

selecting a predefined area or feature of the selected machine component from a known list of areas or features;

selecting a predefined condition from a predetermined list of conditions allowed to be reported for the selected machine component;

inspecting and measuring the predefined areas of the select machine component for the selected condition; and recording inspection data as continuous numerical values to quantify entry for subsequent querying for one of the conditions over a chosen set of different machine components.

2. The method of claim 1, wherein the inspection step comprises:

creating benchmark inspection values for the select machine component by manually entering information into data fields;

copying the benchmark inspection values as default inspection data for other machine components; and comparing inspection data of the other machine components with the copied benchmark inspection values.

3. The method of claim 2, wherein the creation step further comprises:

identifying the benchmark inspection values in a distinct color pattern.

4. The method of claim 1, further comprising:

enabling free field text entries for a group of machine components and for each individual machine component; and adding new data entry fields to each machine component, said data entry fields including (a) part area, (b) part feature, (c) part condition of a machine component, said adding step is performed if said (a), (b), and (c) are included in a predetermined inspection list.

5. The method of claim 4, further comprising:

identifying a minimum structured set of conditions independent of a machine component being inspected.

6. The method of claim 4, wherein said data entry fields include attached or linked files having one or more of coordinate measuring machine (CMM) data-files, bit-mapped schematics, photographs, general text files.

7. The method of claim 4, wherein said data entry fields are added by providing communication links to files stored at a remote location.

8. The method of claim 1, further comprising:

reducing areas or features for inspection; and limiting the conditions of a predefined area of the select machine component.

9. A method for entering and processing inspection data of machine components in a database, the database comprising a plurality of user interface templates, each template including data fields for identifying a machine component, the method comprising:

selecting a machine component among a plurality of machine components;

selecting an area or a feature of the selected machine component in a first menu of user interface template;

inspecting the selected area of the machine component;

recording inspection data as continuous numerical values in a second menu, said second menu identifying a list of conditions related to the select area of the select machine component; and querying the database to perform a search query for one of the conditions over a chosen set of different areas or features of a particular machine component or a chosen set of different machine components.

10. The method of claim 9, wherein the inspection step comprises:

creating benchmark inspection values for the select machine component by manually entering information into data fields;

copying the benchmark inspection values as default inspection data for other machine components; and comparing inspection data of other machine components with the copied benchmark inspection values.

11. The method of claim 9, further comprising:

enabling free field text entries for a group of machine components as well as for each individual machine component; and adding new data entry fields to each machine component.

12. The method of claim 11, further comprising:

identifying a minimum structured set of conditions independent of a machine component being inspected.

13. The method of claim 11, wherein said data entry fields include one or more of coordinate measuring machine (CMM) datafiles, bit-mapped schematics, photographs, general text files.

14. The method of claim 11, wherein said data entry fields are added by providing communication links to files stored at a remote location.

15. The method of claim 9, further comprising:

reducing areas or features for inspection; and limiting the conditions of a predefined area of the select machine component.

16. The method of claim 9, wherein inspection data is entered as integer values.

17. The method of claim 9, wherein the inspection data is stored in a single common unit.

18. An apparatus for inspecting, recording and processing inspection data of machine components, the apparatus comprising:
- means for selecting a machine component among a plurality of machine components for inspection;
- means for identifying predefined areas of the selected machine component for inspection;
- means for identifying a fixed set of conditions allowed to be reported for the select machine component;
- means for inspecting the predefined areas of the select machine component; and
- means for recording inspection data as continuous numerical values to quantify entry for subsequent querying for one of the conditions over a chosen set of different machine components.

19. A method of recording and processing inspection data of machine components in a database system, the method comprising:
- identifying structured inspection areas or features of a select machine component;
- identifying a minimum structured set of conditions that are independent of a machine component under inspection;
- recording condition of the select machine component as continuous numerical values; and
- querying recorded inspection data to perform a search for a particular one of the conditions over a set of different machine components or over a set of different inspection areas or features of a particular machine component.

20. An apparatus for recording and processing inspection data of machine components in a database system, the apparatus comprising:
- means for identifying structured inspection areas or features of a select machine component;
- means for identifying a minimum structured set of conditions that are independent of a machine component under inspection;
- means for recording condition of the select machine component as continuous numerical valued; and
- querying recorded inspection data to perform a search for a particular one of the conditions over a set of different machine components or over a set of different inspection areas or features of a particular machine component.

21. The method of claim 1, wherein the inspection data is recorded as continuous, objectively measured, values.

22. The method of claim 9, wherein the inspection data is recorded as continuous, objectively measured, values.

23. The apparatus of claim 18, wherein the inspection data is recorded as continuous, objectively measured, values.

24. The method of claim 19, wherein the condition of the select machine component is recorded as continuous, objectively measured, values.

25. The apparatus of claim 20, wherein the condition of the select machine component is recorded as continuous, objectively measured, values.

* * * * *